Jan. 13, 1953     L. CHARLSON     2,625,168
FLUID COUPLING
Filed April 29, 1950     4 Sheets-Sheet 1
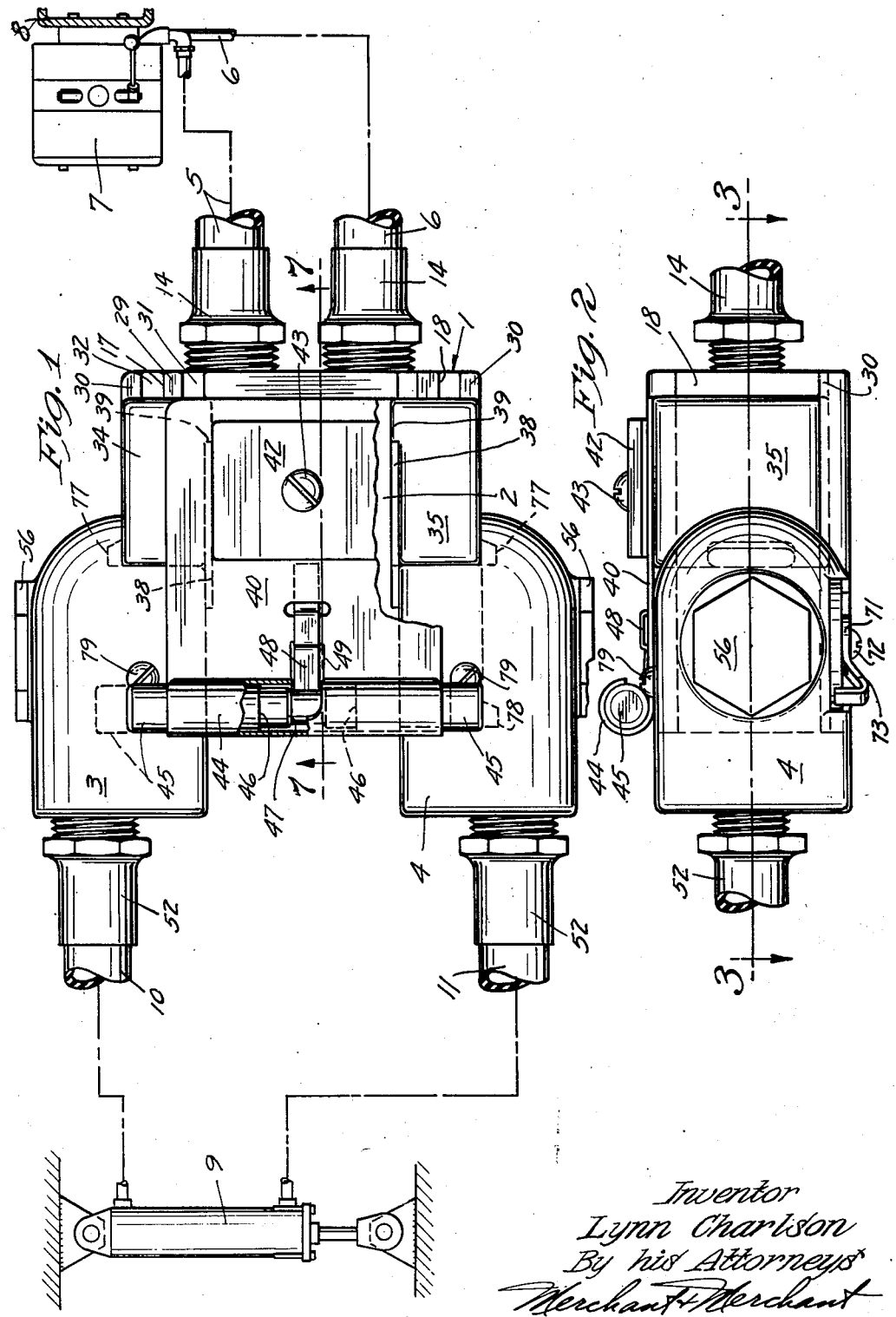
Inventor
Lynn Charlson
By his Attorneys
Merchant & Merchant

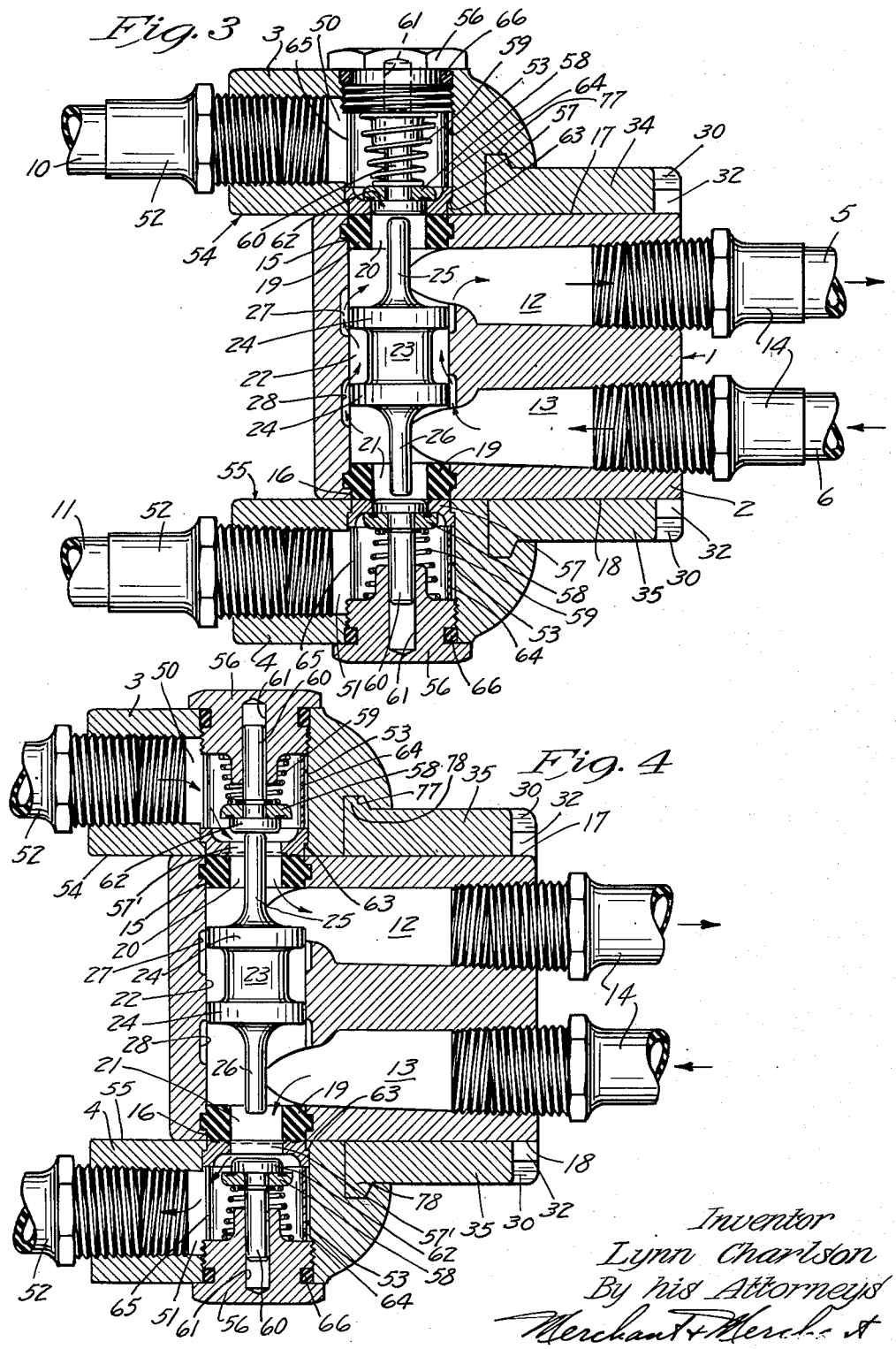

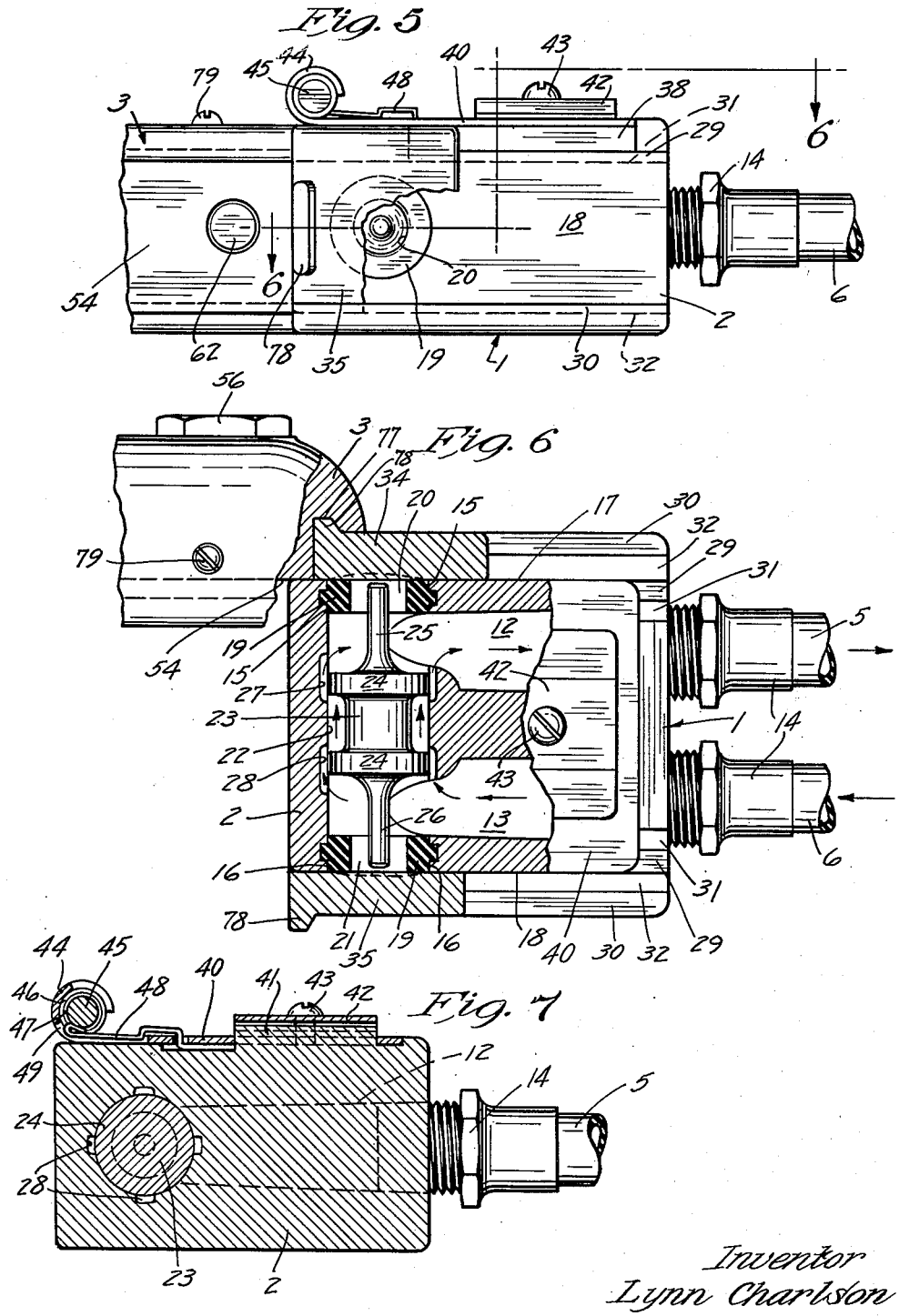

Jan. 13, 1953     L. CHARLSON     2,625,168
FLUID COUPLING
Filed April 29, 1950     4 Sheets-Sheet 4
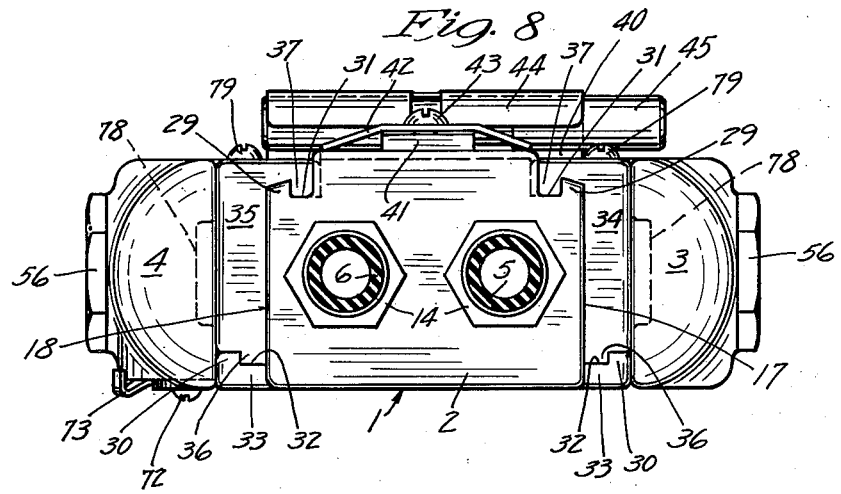
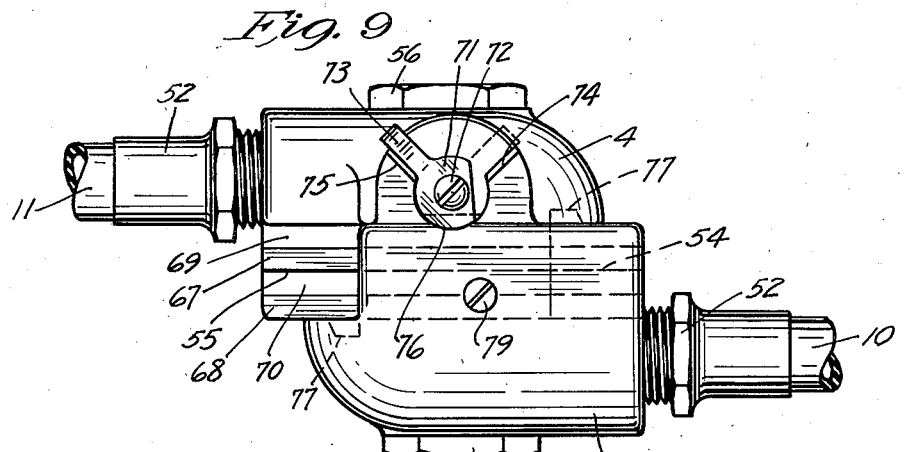
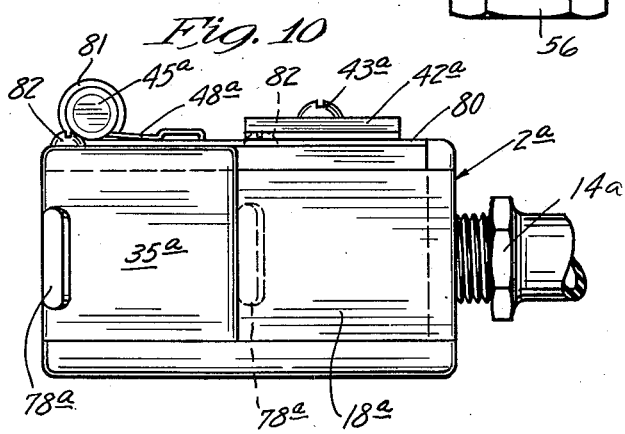
Inventor
Lynn Charlson
By his Attorneys
Merchant & Merchant Patented Jan. 13, 1953

2,625,168

UNITED STATES PATENT OFFICE 2,625,168

FLUID COUPLING

Lynn Charlson, Minneapolis, Minn., assignor to Aeroquip Corporation, Jackson, Mich., a corporation of Michigan Application April 29, 1950, Serial No. 158,963

23 Claims. (Cl. 137—102)

My invention relates generally to coupling devices for fluid pressure conduits and more specifically to couplers utilized in connection with flexible hoses and the like.

In the several fields of endeavor in which fluid under pressure is used as a power transfer medium, it is frequently desirable to disconnect the source of fluid pressure from one fluid pressure operated device and subsequently reconnect said source to the same device, or to a different fluid pressure operated device, with a minimum of effort and without loss of time or of fluid from the system. One of the many instances where these requirements are necessary is in the operation of certain agricultural implements while being drawn by a tractor, the source of fluid pressure being operatively associated with the tractor and the device to be operated being located on the implement.

It is customary with the above arrangement to provide coupling means in the conduits or hoses between the tractor and the implement moved thereby. Frequently, however, an implement drawn by a tractor strikes an obstacle with sufficient force to cause mechanical connection between the tractor and the implement to become disengaged, whereupon further forward movement of the tractor will place sufficient tension on the hoses to cause breakage thereof and loss of the fluid in the pressure system. Buckling of the mechanical connection between the tractor and the implement which sometimes appears when the tractor and implement are moving in a rearward direction is also a cause for breakage of the fluid pressure line. In the event that the coupling means are of the type which permits automatic disconnection when placed under a predetermined tension, the coupling elements usually drop to the ground upon accidental severance and become fouled with dirt and sand. Moreover, this type of coupler is usually difficult to clean properly.

An important object of my invention is the provision of a device which will permit rapid coupling of the source of fluid pressure to the device to be operated, and to permit equally rapid uncoupling thereof.

Another highly important object of my invention is the provision of a coupling device which will permit disconnection of the fluid operated device from the source of pressure when a predetermined tension is applied to the conduits connecting the same, whereby to prevent damage to said conduits or other parts associated therewith.

Another object of my invention is the provision of means for effectively sealing the component parts of my improved coupler against leakage of fluid therefrom or entry of dust or other foreign matter thereinto when in a disconnected condition.

Another object of my invention is the provision of a coupling device as set forth, the coupling elements of which may be easily connected or disconnected irrespective of the pressure of fluid within the conduits associated therewith.

Still another object of my invention is the provision of a coupler body and cooperating valve-equipped coupler heads, and fluid pressure operated means in the body for operating the valves when the heads are coupled to the body, whereby to permit passage of fluid through said heads and body.

A still further object of my invention is the provision of a coupling device comprising a body and a pair of coupling heads, said heads and body having relatively flat cooperating surface portions which may be readily cleaned.

Another object of my invention is the provision of a coupling device in which the flat side portions of the coupler heads may be locked in face-to-face engagement whereby to prevent foreign matter from coming in contact with the relatively flat cooperating surfaces thereof.

Another object of my invention is the provision of a novel latch means for frictionally locking the coupling heads of my invention in operative association with the body thereof.

Another object of my invention is the provision of a coupling device which is relatively simple and inexpensive to produce, which is efficient in operation and durable in use.

Other highly important objects and advantages of my invention will become apparent from the following detailed specification, appended claims, and attached drawings.

In the drawings, which illustrate the invention, like characters indicate like parts throughout the several views.

Referring to the drawings:

Fig. 1 is a view partly in plan and partly diagrammatic showing my improved coupler in a fluid pressure circuit, some parts being broken away and some parts shown in section;

Fig. 2 is a view in side elevation of the coupler of Fig. 1;

Fig. 3 is a view in section taken substantially on the line 3—3 of Fig. 2;

Fig. 4 is a view corresponding to Fig. 3 but showing a different position of some of the parts;

Fig. 5 is a view corresponding to Fig. 2 but showing a different position of some of the parts, other parts being removed and some parts broken away;

Fig. 6 is a view partly in plan and partly in section taken substantially on the line 6—6 of Fig. 5;

Fig. 7 is a vertical section taken on the line 7—7 of Fig. 1;

Fig. 8 is an end elevation as seen from the right to the left with respect to Fig. 2;

Fig. 9 is a plan illustrating the coupling heads of my invention in a locked together position; and Fig. 10 is a view corresponding to Fig. 5 but showing a modified form of the invention.

Referring with greater particularity to the drawings, the numeral 1 indicates in its entirety a coupler comprising a main body 2 and a pair of coupler heads 3 and 4. The body 2 is adapted to be connected by conduits in the nature of flexible hoses or the like 5 and 6, to a source of fluid pressure such as a fluid pressure pump 7. The pump 7 may be of any conventional type mounted to and driven by suitable drive means on a tractor. As shown, the pump 7 is rigidly secured to a suitable mounting bracket 8 which may be assumed to be mounted on a tractor or the like not shown. The coupler heads 3 and 4 are shown in Fig. 1 as being connected to opposite end portions of a fluid pressure cylinder 9 by conduits in the nature of flexible hoses or the like 10 and 11 respectively.

The body 2 is provided with a pair of laterally spaced longitudinally extending passages 12 and 13 which communicate at one end of the body with the hoses 5 and 6 respectively. The hoses 5 and 6 are secured to the body 2 by suitable fittings 14 screw-threaded into the outer threaded ends of the passages 12 and 13. The passages 12 and 13 terminate in axially aligned openings 15 and 16 opening outwardly in opposite side walls 17 and 18 respectively of the body 2. A pair of sealing rings or grommets 19 are snugly seated in the openings 15 and 16 and define ports 20 and 21 for the passage of fluid laterally of side walls 17 and 18 respectively of the body 2. The sealing rings 19 are preferably made from oil resistant rubber-like material and normally project axially outwardly slightly beyond the planes of the relatively flat opposite side walls 17 and 18 adjacent the ports 20 and 21 as indicated by dotted lines in Figs. 3, 4, and 6.

A cylinder-like chamber 22 extends transversely of the body 2 in axial alignment with the openings 15 and 16 and communicate at opposite ends with the passages 12 and 13. A piston 23 is mounted for axial sliding movements in the chamber 22 and is provided with axially spaced flanges 24 which slidably engage the cylindrical wall of the chamber 22 with sufficient clearance to permit easy sliding action. On the opposite ends of the piston 23 are integrally formed plungers or ramrods 25 and 26 which extend axially outwardly of the piston 23 into and concentric with the respective ports 20 and 21. By reference to Fig. 3 it will be seen that when the piston 23 is in a static condition transversely centrally of the body 2, that the outer ends of the ramrods 25 and 26 terminate short of their adjacent side walls 17 and 18. To permit flow of fluid through the chamber 22 from the passage 13 to the passage 12, for a purpose which will hereinafter become apparent, I provide a plurality of circumferentially spaced grooves or channels 27 in the wall of the cylindrical chamber 22 extending axially inwardly a short distance from the chamber 12, a plurality of similar grooves 28 extending laterally inwardly a short distance from the passage 13. The grooves 27 and 28 extend an axial distance sufficient to permit flow of fluid from one of the passages to the other when the piston 23 is centrally disposed in the chamber 22. Inasmuch as the grooves or channels 27 and 28 are restricted the quantity of fluid flowing therethrough is relatively small. As indicated in Fig. 4, the piston 23 is movable axially to a point where one of the ramrods 25 or 26 thereof projects outwardly of the body 2 as will hereinafter be more fully described.

The body 2 is formed to provide longitudinally extending upwardly projecting flanges 29 and 30 at opposite lateral edges of the opposite sides 17 and 18. The flanges 29 each define one side of a pair of upwardly opening guide channels 32. With reference to Fig. 8 it will be seen that the flanges 30 are connected to the main body 2 by integrally formed laterally outwardly projecting portions 33 which define the bottoms of the channels 32. A pair of slide elements 34 and 35 are mounted for sliding movements in the guide channels adjacent a respective side 17 and 18. The slide elements 34 and 35 are each formed with a flat inner face which slidably engages the relatively flat side wall of the body 2. At their bottom edges the slide elements 34 and 35 are formed to provide downwardly projecting flanges 36 which are slidably contained within the channels 32, and at their top edges with inwardly and downwardly projecting flanges 37 which are adapted to be received in the channels 31. The body 2 is formed to provide longitudinally extended recesses 38 opening laterally outwardly into one side of the channels 31 and which are adapted to receive inwardly projecting lugs 39 on the slide elements 34 and 35 for sliding movements therein. The opposite ends of the recesses 38 limit sliding movements of the slide elements 34 and 35 longitudinally of the body 2. In one limit of their movement, the slides 34 and 35 are disposed adjacent the end of the body 2 to which the hoses 5 and 6 are connected. At their opposite limits of movement, the slide elements 34 and 35 are in positions to close the ports 20 and 21 adjacent the opposite end of the body 2. When the slide elements are moved toward port closing positions, the outwardly projecting portion of the sealing rings 19 will be compressed axially inwardly by camming engagement of the slide therewith so as to have sealed engagement with the slides whereby to prevent leakage of fluid therebetween.

I provide means for retaining the slide elements 34 and 35 in the channels of the main body 2, said means comprising a relatively flat resilient retainer plate 40. The plate 40 is provided with a generally rectangular opening adjacent one end thereof which closely receives a rectangular boss 41 extending upwardly from the body 2. An arched resilient clamping plate 42 straddles the boss 41 and has its opposite edge portions resting on the retainer plate 40. A clamping screw 43 extends downwardly through a central opening in the clamping plate 42 and is screw-threaded into the boss 41. As indicated in Fig. 7 the central portion of the clamping plate 42 is in spaced relationship to the top surface of the boss 41 whereby clamping pressure may be varied by adjustment of the clamping screw 43. The opposite side edge portions of the retainer plate 40 extend laterally over the channels 31 and flanges 29 whereby to cooperate therewith to form guideways for the slide elements 34 and 35.

The free end portion of the retainer plate 40 is curled backwardly upon itself to provide a substantially tubular bearing 44 extending transversely of the body 2 in which is axially slidably mounted latch bolt or the like 45. The latch bolt 45 is of substantially greater length than the bearing 44 and at its central portion is diametrically reduced in a manner to provide a pair of opposed axially spaced stop shoulders 46 and axially spaced annular cam faces 47 between the shoulders 46. A leaf spring 48 is anchored to the retainer plate 40 and extends longitudinally of the body 2 through an opening 49 into engagement with the bolt 45 intermediate the annular cam surfaces 47 when the bolt or pin 45 is centered axially of the bearing 44. Movement of the bolt 45 axially of the bearing 44 causes the spring 48 to be depressed by engagement of one of the cam faces 47 after which further axial movement of the bolt 45 in the same direction will cause the adjacent stop shoulder 46 to engage one slide edge of the spring 48 whereby to positively limit further axial movement of the bolt 45.

The coupler heads 3 and 4 are provided with respective passages 50 and 51 extending inwardly from the outer ends of the coupler heads and which are screw-threaded to receive the screw-threaded ends of fittings 52 one each on the end of the hoses 5 and 6. The heads 3 and 4 are each provided with a transverse passage 53 communicating with their respective passages 50 and 51 and opening laterally inwardly through relatively flat sides 54 and 55 on the heads 3 and 4 respectively, said flat sides being adapted to engage the flat side portions 17 and 18 respectively of the body 2. Each of the transverse passages 53 are closed at their outer ends by a guide element 56 and at their inner ends are provided with annular valve seats 57. A gasket-equipped poppet type valve 58 is mounted for sliding movements in the guide 56 of the head 3 and is biased toward seating engagement with the valve seat 57 therein by a coil compression spring 59. The valve 58 is provided with a stem 60 which moves axially in a recess 61 in the guide element 56. As clearly shown in Figs. 3 and 4, the valve stem 60 extends through the valve 58 and is provided inwardly thereof with a head 62 which projects loosely axially through the central opening or port 57' of the valve seat, when the valve 58 is in a closed position, to a point flush with the outer surface of the valve seat 57 and the relatively flat face 54 of the head 3. A valve structure similar to that immediately above described is mounted in the head 4, the component parts of the valve structure thereof being identified by the same characters as similar parts of the valve structure contained in the head 3. Preferably, the valve seat 57 has a diametrically reduced end portion which provides a shoulder 63 having abutting engagement with a mating shoulder in its respective head 3 or 4. The valve seat 57 in each head is held firmly therein by a cylindrical sleeve 64 interposed therebetween and the inner portion of the guide element 56. Each sleeve 64 is provided with an axially extended opening 65 which permits free flow of fluid between the passages 50 and 51 and their respective valves 58. As shown, a rubber-like gasket or sealing ring 66 between each guide element 56 and its respective coupler head prevents leakage of fluid.

Each coupler head 3 and 4 is provided with longitudinally extending flanges 67 and 68 one each in the opposite side edge of the respective relatively flat body-engaging sides 54 and 55 thereof. Flanges 67 and 68 each define one side of respective longitudinally extending channels 69 and 70, the flanges 67 and 68 of the coupler heads being receivable in the channels 31 and 32 on opposite sides of the body 2. The flanges 67 and 68 are further so disposed on the heads 3 and 4 as to make the coupler heads right and left hand, thus permitting operative engagement of each coupler head with but one side of the body 2. The arrangement of the flanges 67 and 68 on the heads 3 and 4 also permits the coupler heads to be coupled to each other when removed from the body 2 as indicated in Fig. 9, in which position they may be locked against relative endwise head separating movement by a rotary catch 71 mounted for rotation on the head 4 by a machine screw or the like 72. The catch 71 is provided with a handle 73 which is adapted to engage stop shoulders 74 and 75 whereby to limit rotary movement of the catch 71. When the handle 73 is moved to abutting engagement with the shoulder 75, a portion of the catch 71 enters a recess 76 in the head 3 and locks the heads 3 and 4 against relative endwise movement. Movement of the handle 73 into engagement with the shoulder 74 retracts said portion of the catch 71 from the recess 76 and permits the heads 3 and 4 to be separated.

Each of the coupler heads 3 and 4 adjacent its free end is provided with a recess 77 which is adapted to receive a laterally outwardly projecting lug 78 on the adjacent end portion on each of a respective one of the slide elements 34 and 35. The recess 77 on each coupler head is positioned longitudinally outwardly of the flanges 67 and 68 thereof whereby to permit reception of the lug 78 thereinto when the slide elements 34 and 35 are moved to the extreme port closing limits of their movement with respect to the body 2. When the lug 78 of one of the slide elements is received in the recess 77 of its cooperating coupler head, the coupler head is automatically positioned for sliding movements into face-to-face engagement with the respective side of the body 2 toward alignment of the port 57' with the port 21. Sliding movement of the coupler head in this direction moves the cooperating slide element toward its opposite limit of movement. When the slide element has reached this said opposite limit of movement, the valve 58 in the coupler head is automatically axially aligned with the adjacent ramrod of the piston 23.

Securely mounted on each of the coupler heads 3 and 4 are detents in the nature of screw heads or the like 79 which, under body engaging movements of the coupler heads 3 and 4, are engageable with opposite end portions of the latch bolt 45. As indicated by dotted lines on Fig. 1, the latch bolt 45 is movable into and out of the paths of travel of the detents 79. When the bolt 45 is centrally positioned with respect to the spring 48, the opposite end portions of the bolt 45 each lie in the path of travel of a separate detent 79. As shown, the detents 79 are so positioned longitudinally of the coupler heads 3 and 4 that the opposite end portions of the latch bolts 45 engage one side of the detents 79 when the valves 58 are in axial alignment with the ramrods 25 and 26 of the piston 23. The retainer plate 40 has sufficient rigidity to prevent the coupler heads 3 and 4 from accidentally slidably moving out of engagement with their respective side walls 17 and 18 of the body 2. However, when a predetermined tension is applied to hoses 5 and 6 with respect to the hoses 10 and 11, the retainer plate 40 will flex sufficiently to permit the detents 79 to move the latch bolt laterally out of the path of detent travel by a camming action thereagainst whereby to allow the coupler heads 3 and 4 to become disengaged from the body 2. However, when manually applying the coupler heads 3 and 4 to the body 2 and when removing the heads therefrom, the latch bolt 45 is manually axially moved to permit unrestricted movement of the heads.

When it is desired to introduce fluid under pressure to one end of the cylinder 9, a control valve associated with the pump 7 is manipulated to cause fluid to flow through the conduit 6 and into the passage 13 of the coupler body 2, assuming the fluid in this instance to be hydraulic fluid or oil. The differential in fluid pressure between the passages 13 and 12, and between the passage 13 and the passage 50 in the head 4, causes the piston 23 to move in the direction of the head 3 and the valve 58 in the head 4 to open against bias of its spring 59. Movement of the piston 23 in the direction of the head 3 causes the ramrod 25 to engage head 62 of the valve 58 therein to open said valve, thus permitting fluid to flow from the opposite end of the cylinder 9 through the conduits 10 and 5 to the pulleys 7. When the piston contained in the cylinder 9 reaches its limit of travel therein, fluid pressure on opposite sides of the valve 58 in the coupler head 4 becomes equalized thereby permitting the spring 59 in the coupler head 4 to close the valve 58 thereof. During this time, the relatively high fluid pressure in the passage 13 causes the ramrod 25 to hold the valve 58 in the coupler head 3 open. There is, however, sufficient clearance between the flanges 24 of the piston 23 and the side wall of the chamber 22 to permit seepage of fluid from the passage 13 through the chamber 23 to the passage 12 in the body 2. Normally, when the piston of the cylinder 9 reaches its limit of travel, the operator manipulates the valve associated with the pump 7 to a neutral position wherein flow of fluid to the passage 13 through the conduit 6 ceases, whereupon seepage of fluid through the chamber 22 tends to equalize the pressure between the passages 13 and 12, thus permitting the valve 58 in the coupler head 3 to move toward its closed position while moving the piston 23 toward its neutral position indicated in Fig. 3. As the piston 23 approaches its neutral position, one of the flanges 24 moves toward a position of full register with the grooves 28. When this occurs, equalizing movement of fluid from the passage 13 to the passage 12 becomes more rapid and allows correspondingly rapid closing of the valve in the coupler head 3. Reverse flow of fluid through the system causes piston 23 to move in the opposite direction whereby the ramrod 26 will engage the valve in the coupler head 4 to open same, fluid pressure against the head 62 of the valve in the coupler head 3 being sufficient to open the valve 58 therein against bias of its spring 59. It should be noted that when the valves in both coupler heads 3 and 4 are closed that the system between the coupler heads and the fluid operated device 9 is closed whereby to hydraulically lock the piston of the cylinder 9 against movement with respect thereto until pressure is reapplied in one of the passages 12 or 13 of the coupler body 2 from the pump 7.

The particular arrangement of the valves 58 in the coupler heads 3 and 4 permits relatively easy connection and disconnection of the coupler heads from the body 2 with regard to the amount of pressure in the system due to the fact that the coupler heads have a mechanical connection with the body 2 and do not depend upon a differential in fluid pressure for this connection. Furthermore, the flat cooperating sides or mating surfaces of the valve body 2, the slide elements 34 and 35 and the coupler heads 3 and 4 permits easy cleaning thereof and assures efficient sealing against leakage of fluid therebetween.

In the modified structure shown in Fig. 10, parts identical to those illustrated in Figs. 1 through 8 inclusive are identified by the same numerals with exponent $a$ added. Thus the coupler body $2a$ is shown as having a hose fitting $14a$ threaded into one end thereof and a slide element $35a$ working against a side surface $18a$. A retainer plate 80 is mounted on the body $2a$ and clamped thereagainst by a clamping plate $42a$ and a clamping screw $43a$. At its free end, the retainer plate 80 is formed to provide tubular bearing 81 in which is axially slidably carried a latch bolt $45a$. A leaf spring $48a$ is mounted in the same manner as the spring 48 of the structure in Figs. 1 through 9 inclusive and engages the latch bolt $45a$ in the same manner as the spring 48 engages the latch bolt 45. It will be noted that the latch bolt $45a$ is inwardly spaced a greater distance from the adjacent end of the main body $2a$ than is the latch bolt 45 from the adjacent end of the main body 2. The slide element $35a$ is provided with a detent in the nature of a screw head or the like 82 which cooperates with the adjacent end of the latch bolt $45a$ to frictionally lock the slide element $35a$ in port closing position at one extreme limit of its movement. Although not shown, a slide element on the opposite side of the body $2a$ is also provided with a detent which cooperates with the opposite end portion of the latch bolt $45a$. Obviously, with the latch bolt $45a$ thus inwardly spaced from the adjacent end of the body $2a$, the cooperating detents on the coupler heads, not shown, would be spaced a lesser distance from the free ends of the coupler heads than are the detents 79 of the coupler heads 3 and 4.

My invention has been thoroughly tested and found to be highly satisfactory for the accomplishment of the objectives set forth; and while I have shown a preferred commercial embodiment and one modified form of my device, it should be understood that the same is capable of further modification without departure from the spirit and scope of the invention as defined in the claims.

What I claim is:

1. A fluid coupler comprising a main body element having laterally-spaced independent fluid passages therethrough, said passages terminating at one end in ports on opposite sides of said body and adapted to be secured at their other ends to a source of fluid under pressure, said body intermediate said fluid passages defining a chamber communicating with said passages, a piston mounted for sliding movements in said chamber, ram members on opposite sides of said piston registrable with and projectable through said ports upon movements of said piston in opposite directions, slide elements one on each side of said body element, means mounting said slide elements for movements to and from port-closing positions, a pair of coupling heads each having a fluid passage therethrough, said passages terminating in normally-opposed ports at one of their ends, valves in said last-mentioned ports normally biased toward a closed position, and means detachably securing one each of said coupling heads to one of said slide elements and its cooperating mounting means for movements into and out of registration of the ports therein with the ports in said head, fluid under pressure introduced into one of the passages in the body element causing movements of the piston in the direction of the other passage and engagement of one of the ram members with the valve in the head adjacent said other passage to unseat the same.

2. The structure defined in claim 1 in further combination with means positively limiting movements of said slide elements in opposite directions with respect to said head.

3. The structure defined in claim 1 in which the said means mounting said slide elements comprises laterally-spaced elongated guide channels in one of said elements opening in a direction transversely of the direction of movement of said slide elements, and lugs on the other of said elements receivable within said channels, and in further combination with detachable means retaining said lugs within said channels.

4. The structure defined in claim 1 in which the ports in said head and the ram members on said piston are in axial alignment.

5. The structure defined in claim 1 in further combination with yielding means for frictionally retaining said coupler heads in port-registering positions on said body.

6. A fluid coupler comprising a main body having laterally-spaced independent fluid passages therethrough, said passages terminating at one end in aligned ports on opposite sides of said body and adapted to be secured at their opposite ends to a source of fluid under pressure, said body intermediate said fluid passages defining a cylinder axially aligned with said ports and communicating with said passages, a piston mounted for sliding movements in said cylinder, ram rods on opposite sides of said piston registrable with and projectable through said ports upon movements of said piston in opposite directions, said body being provided with guide channels on each side of each of said ports, said guide channels extending longitudinally of said body and opening in a direction transversely to the axis of the ports, a detachable retaining plate secured to said body and overlying one of the channels on opposite sides thereof and cooperating with said channels to define open-ended guideways, a pair of slide elements receivable within said guideways for movements to and from port-closing positions, means limiting movements of the slide elements in opposite directions, a pair of coupler heads slidably receivable in said guideways through the open ends thereof and having fluid passages extending therethrough, said passages terminating at their inner ends in laterally inwardly-opening ports, the ports in said heads being registrable with the ports in said body when said heads are moved to their limit of movement in said guideways, and valves in said heads normally biased toward a port-closing position, fluid under pressure introduced into one of the passages in the body causing movements of the piston in the direction of the other passage and engagement of one of the ram rods with the valve in the head adjacent said other passage to unseat said valve.

7. The structure defined in claim 6 in further combination with means for detachably securing said coupler heads to said slide elements when said slide elements are moved to port-closing position.

8. The structure defined in claim 6 in further combination with yielding means for retaining said coupler heads on said guideways in port-registering positions, said means comprising latch elements on the heads adapted to cooperate with latch elements associated with said body.

9. The structure defined in claim 1 in further combination with yielding means tending to retain said slide elements in port-closing positions.

10. A fluid coupler comprising a main body having fluid passages therein, said passages extending from one end of said body where they are adapted to be secured to a source of fluid pressure, said passages terminating adjacent the other end of the body in ports on opposite sides thereof, said body being provided with longitudinally-extended guide channels on each side of each of said ports, a detachable retaining plate on said body, opposite edges of said plate overlying the channels on opposite sides of said body and cooperating with said channels to define guideways open at said other end of the body, said plate extending for substantially the length of said channels and being secured to said body remote from said other end thereof whereby the free end of said plate may be moved outwardly from said body, a slide element mounted for sliding movements in each of said guideways into and out of port-closing positions, stop means positively limiting sliding movements of said slides in opposite directions, a pair of coupler heads slidably receivable in said guideways through the open ends thereof and having fluid passages therethrough, said passages terminating at their inner ends in laterally inwardly-opening ports, said ports being registrable with the ports in said heads when the heads are moved to their limit of movement in said guideways, valves in said heads normally biased toward port-closing positions, a latch detent on each of said heads, and cooperating latch members projecting laterally from opposite sides of the free end of said plate and normally lying in the path of travel of said latch detents.

11. The structure defined in claim 10 in which said plate is secured to said body by adjustable yielding means whereby the tension of said latch members may be varied.

12. The structure defined in claim 10 in further combination with means for preventing transverse movements of the said retaining plate with respect to said body.

13. The structure defined in claim 10 in which the free end of the said retaining plate is curled backwardly to form a substantially tubular bearing and in which said latch members comprise opposite end portions of a latch bolt mounted for axial sliding movements in said tubular portion in a direction tranversely of said guideways into and out of the path of travel of said latch detents, and in further combination with means limiting axial sliding movements of said latch bolt.

14. The structure defined in claim 10 in further combination with means for detachably securing said coupler heads to said slide elements when said slide elements are moved to port-closing position.

15. A fluid coupler comprising a main body having fluid passages therein, said passages extending from one end of said body to points adjacent the other end of the body and terminating in ports on the opposite sides thereof, said body being provided with longitudinally-extended guide channels on each side of each of said ports, a retaining plate overlying a portion of said body, the opposite edges of said plate each extending over one of said channels and cooperating with said channels to define guideways open at said other end of the body, cooperating means on said body and said plate for positively locking said plate against longitudinal and lateral movements thereof with respect to said body while permitting movements thereof away from said body in a direction transversely thereof, adjustable yielding means urging said retaining plate toward face-to-face contact with said body, said adjustable yielding means comprising an arched resilient clamping member overlying a portion of said retaining plate, and screw means securing said clamping member to said body, said clamping member and said screw means being remote from said other end of said body whereby the free end of said plate may be flexed away from said body, a pair of slide elements mounted one each for sliding movements in one of said guideways in face-to-face contact with a side of said body and into and out of port-closing positions, stop means positively limiting sliding movements of said slide elements in opposite directions, a pair of coupler heads slidably receivable in said guideways through the open ends thereof and having fluid passages therethrough, said passages terminating at their inner ends in laterally-opening ports, said ports being registerable with the ports in said heads when said heads are moved to their limit of movement in said guideways, valves in said heads normally biased toward port-closing positions, a latch detent on each of said heads, and cooperating latch members projecting laterally from opposite sides of the free end of said plate and normally lying in the path of travel of said latch detents.

16. The structure defined in claim 15 in which the free end of the said retaining plate is curled backwardly to form a substantially tubular bearing and in which said latch members comprise opposite end portions of a latch bolt mounted for axial sliding movements in said tubular portion in a direction transversely of said guideways into and out of the path of travel of said latch detents, and in further combination with means limiting axial sliding movements of said latch bolt, said means comprising a centrally-reduced portion in said latch bolt and yielding means engaging said reduced central portion whereby to frictionally maintain said latch bolt in desired set position within the limits of axial movement thereof.

17. The structure defined in claim 15 in which said body intermediate said passages defines a cylinder axially aligned with said ports and communicating with said passages, and in further combination with a piston mounted for axial sliding movements in said cylinder, ram rods on the opposite sides of said piston registrable with and projectable through said ports upon movements of said piston in opposite directions when fluid under pressure is introduced into opposite passages in said body.

18. A fluid coupler comprising a main body having fluid passages therein, said passages extending from one end of said body where they are adapted to be secured to a source of fluid pressure, said passages terminating adjacent the other end of the body in ports on opposite sides thereof, said body being provided with longitudinally-extended guide channels on each side of each of said ports, a detachable retaining plate on said body, the opposite edges of said plate each overlying one of said channels and cooperating with said channels to define guideways open at said other end of the body, said plate extending for substantially the length of said channels and being secured to said body remote from said other end thereof whereby the free end of said plate may be moved outwardly from said body, a slide element mounted for sliding movements in each of said guideways in face-to-face contact with an opposite side of said body and into and out of port-closing positions, stop means positively limiting sliding movements of said slides in opposite directions, a pair of coupler heads slidably receivable in said guideways through the open ends thereof and having fluid passages therethrough, said passages terminating at their inner ends in laterally inwardly-opening ports, said ports being registrable with the ports in said heads when the heads are moved to their limit of movement in said guideways, valves in said heads normally biased toward port-closing positions, a latch detent on each of said heads, a latch detent on each of said slide elements, and cooperating latch members projecting laterally from opposite sides of the free end of said plate and normally lying in the path of travel of said latch detents whereby to maintain said heads in register with said ports when the heads are applied to said body and to maintain said slide elements in port-closing positions when the heads are removed from said body.

19. The structure defined in claim 1 in further combination with annular resilient sealing rings in opposite sides of said body extending about said ports, said sealing rings having portions normally projecting laterally outwardly of the planes of said sides and compressible to said planes by said slide elements when said slide elements are moved to port-closing positions whereby to make sealing engagement therewith.

20. The structure defined in claim 10 in which said latch members comprise opposite end portions of a latch bolt mounted for sliding movements into and out of the path of travel of said latch detents and extending transversely of said guideways.

21. The structure defined in claim 15 in which said latch members comprise opposite end portions of a latch bolt mounted for sliding movements into and out of the path of travel of said latch detents and extending transversely of said guideways.

22. A fluid coupler comprising a main body element having laterally-spaced independent fluid passages therethrough, said passages terminating at one end in spaced independent ports on the side of said body and adapted to be secured at their other ends to a source of fluid under pressure, said body intermediate said fluid passages defining a chamber communicating with said fluid passages, a piston mounted for sliding movements in said chamber, spaced members associated with said piston and projectible outwardly of said body upon movements of said piston in opposite directions, slide elements on said body one for each of said ports, means mounting said slide elements for movements to and from port-closing positions, a pair of coupling heads each having a fluid passage therethrough, said passages terminating in laterally-opening ports at one of their ends, valves in last-mentioned ports normally biased toward a closed position, and means detachably securing one each of said coupling heads to one of said slide elements and its cooperating mounting means for movements into and out of registration of the ports therein with the ports in said head, fluid under pressure introduced into one of the passages in the body element causing movement of the piston in the direction of the other passage and unseating of the valve in the adjacent head.

23. A fluid coupler comprising a main body element having laterally-spaced independent fluid passages therethrough, said passages terminating at one end in spaced independent ports on the side of said body and adapted to be secured at their other ends to a source of fluid under pressure, said body intermediate said fluid passages defining a chamber communicating with said fluid passages, a piston mounted for sliding movements in said chamber, spaced members associated with said piston one each terminating adjacent one of said ports and projectible through said ports upon movements of said piston in opposite directions, slide elements on said body one for each of said ports, means mounting said slide elements for movements to and from port-closing positions, a pair of coupling heads each having a fluid passage therethrough, said passages terminating in laterally-opening ports at one of their ends, valves in said last-mentioned ports normally biased toward a closed position, and means detachably securing one each of said coupling heads to one of said slide elements and its cooperating mounting means for movements into and out of registration of the ports therein with the ports in said head, fluid under pressure introduced into one of the passages in the body element causing movement of the piston in the direction of the other passage and engagement of one of said members with the valve in the head adjacent said other passage to unseat the same.

LYNN CHARLSON.

REFERENCES CITED

The following references are of record in the file of this patent:

UNITED STATES PATENTS

| Number | Name | Date |
|---|---|---|
| 1,789,306 | Ewald | Jan. 20, 1931 |
| 1,955,154 | Temple | Apr. 17, 1934 |
| 2,222,746 | Kamenarovic | Nov. 26, 1940 |
| 2,410,978 | Kelly | Nov. 12, 1946 |
| 2,500,847 | McKay | Mar. 14, 1950 |